Oct. 4, 1966  F. L. DIRKS ETAL  3,276,416

SAFETY DEVICE

Filed July 7, 1965

INVENTORS
FREDERICK L. DIRKS
CURTIS W. LEMBERG
BY Merchant, Merchant & Gould
ATTORNEYS

United States Patent Office 3,276,416
Patented Oct. 4, 1966

3,276,416
SAFETY DEVICE
Frederick L. Dirks, 3249 3rd Ave. S., and Curtis W. Lemberg, 6843 Regent Ave. N., both of Minneapolis, Minn.
Filed July 7, 1965, Ser. No. 470,065
1 Claim. (Cl. 116—28)

This invention pertains to a light reflecting safety device and more particularly to a light reflecting safety device which can be utilized as a safety belt or which can be temporarily attached to a vehicle or the like to clearly indicate the presence of the person or vehicle to moving vehicles.

In general, prior art safety belts and the like are extremely expensive and not adapted for use other than as a safety belt. These prior art devices are generally used by police officers directing traffic, school children directing traffic at crossings, etc. The uses of these prior art devices are limited because of the expense and because of the difficulty in storing the belts, putting the belts on, etc. Also, safety devices for indicating the presence of a parked or slow moving vehicle to operators of moving vehicles consist generally of permanent reflectors, electrical devices or flares and the like. All of these devices are expensive, hard to store and in many cases hard to operate or dangerous. In addition each of these devices can be used only for the single purpose intended.

The present invention is an inexpensive multipurpose safety device several of which can be stored conveniently in glove compartments of cars, near the door in school buses, etc. Then, in the even that the car is stalled in the evening, the driver can temporarily place one or two of the devices on the back and front of the car so that other motorists can clearly see the car and, also, if the driver has to walk any distance along the road he will have one of the devices handy to put on so that he can easily be seen by other motorists. Because the present device can be constructed inexpensively large numbers of them can be stored on school buses, etc., for use by children when walking from home to the school bus and back. Thus, the present invention is a safety device which is inexpensive and which can be quickly adjusted to fit any individual and can be quickly attached to any metal surface of vehicles, such as automobiles, trucks, farm tractors, etc., to efficiently indicate the presence of an individual or a vehicle to moving traffic.

It is an object of the present invention to provide a new and improved safety device.

It is a primary object of this invention to provide a safety device numbers of which can be easily stored in a vehicle for emergency use on the vehicle or on the operator of the vehicle to prevent the accidental striking of the vehicle or the operator by a moving vehicle during periods of darkness.

It is a further object of the present invention to provide a safety device which can be utilized as a safety belt for an individual or a reflector for vehicles and the like.

It is a further object of the present invention to provide an extremely inexpensive safety device to be utilized for the purposes mentioned above.

It is a further object of the present invention to provide a safety device which is extremely attractive to children and which can be made easily available to them.

These and other objects of this invention will become apparent to those skilled in the art upon consideration of the accompanying specification, claims, and drawings.

Referring to the drawings, wherein like characters indicate like parts throughout the figures.

Figure 2:
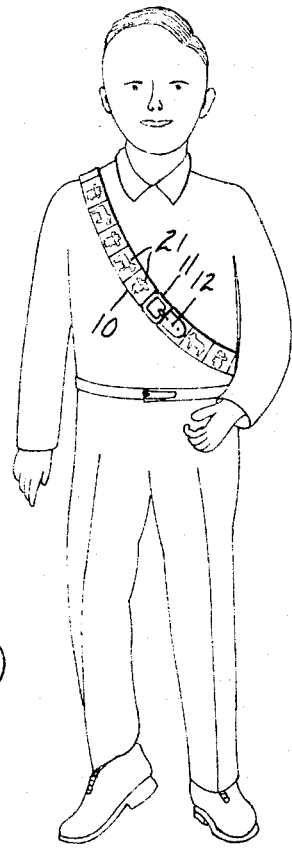
FIG. 2 illustrates the present device worn by an individual as a safety belt.

In the figures the numeral 10 designates an elongated strip of flexible material which may be paper, washable fabric, some type of plastic which is flexible and can be easily wiped off, etc. The flexible strip 10 has a buckle 11 at one end and mating holes 12 at the other end for connecting the strip as a belt about an individual. FIG. 2 illustrates one of the modes of connecting the flexible strip 10 about an individual so that a maximum amount of the strip is visible to a passing motorist or the like.

Figure 1:
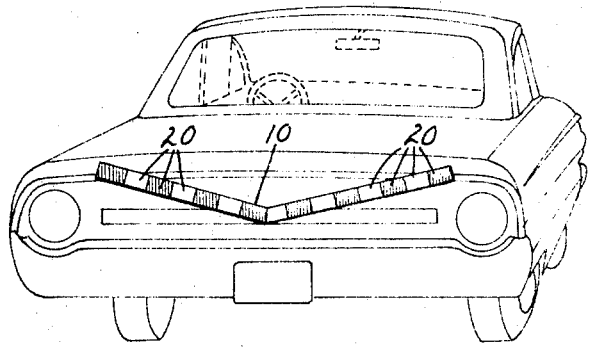
FIG. 1 is a view in perspective of an automobile having the present safety device attached to the rear thereof.
Figure 3:
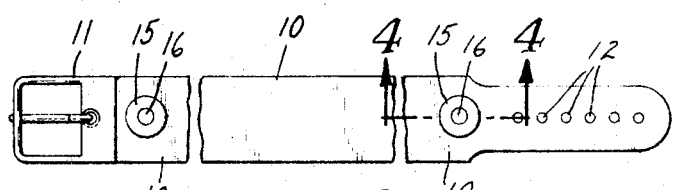
FIG. 3 is a rear view of the safety device illustrating one means for connecting the belt about an individual and means for attaching it to a metal surface.
Figure 4:
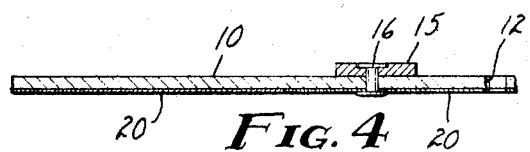
FIG. 4 is a sectional view as seen from the line 4—4 in FIG. 3.

A plurality of devices, such as magnets 15, for quickly attaching the strip 10 to a metal surface of a vehicle are fixedly attached to the strip 10 at various desired points. In FIG. 3 a pair of cylindrical-shaped magnets 15 are attached to the strip 10 adjacent either end thereof. The magnets 15 may be attached by some means such as a rivet 16 passing through the center of each of the magnets 15 and through a hole in the strip 10 as illustrated in cross section in FIG. 4. FIG. 1 illustrates the strip 10 attached to the rear end of an automobile by means of the magnets 15.

A highly reflective material 20 is attached to the outside of the strip 10 by some convenient means and may in fact be a highly reflective paint. In the case of reflective paints several colors can be obtained and a pattern such as red and white rectangular-shaped sections can be produced which will quickly attract the attention of an operator of a moving vehicle. It may be desirable to apply the reflective material in the forms of various objects 21 so that the safety device will be attractive to children. This is especially true when children have to walk along highways at night, such as from a school bus to their home, and frequent wearing of the safety device is required.

A number of the present devices can be stored on vehicles such as cars or trucks and in the event of an emergency, such as a flat tire or the like, several of the strips can be attached to the car in the fashion shown in FIG. 1 or in a manner to outline the car or truck and the operator of the vehicle can wear one of the devices while working on the car or truck. In this manner the chances of accidently being struck by moving vehicles is greatly reduced since the reflecting material 20 reflects the light produced by the headlights of the moving vehicle and clearly indicates the presence of a vehicle and/or a pedestrian.

Figure 5:
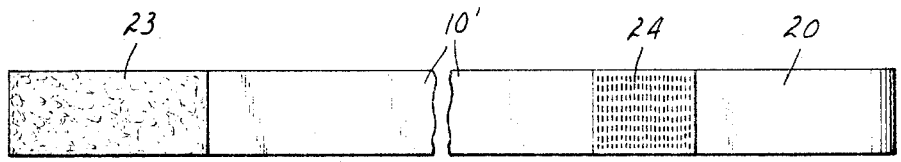
FIG. 5 is a rear view of a safety device illustrating a different embodiment thereof.

In FIG. 5 an embodiment of the present safety device is illustrated in which a material selling under the trade name "Velcro" is attached to a strip of flexible material 10' in place of the buckle 11. "Velcro," which is a nylon fastening device, is made up of two parts, a portion 23 of matted elongated fibers which are fixedly attached at either end to the strip 10', or to a base material which is then attached to the strip 10', and a portion 24 which is made up of a large plurality of very small hook-shaped, regularly-shaped pieces of nylon which are attached by one end to the strip 10', or to a base material as mentioned above. When the portion 24 and the portion 23 are pushed together in parallel overlying relationship the hooks engage the matted fibers to hold the two ends of the strip 10' firmly together. When it is desired to remove the strip 10' the two pieces 23 and 24 are simply pulled apart. This device is easily adjustable to all sizes of individuals and the nylon portions 23 and 24 will not mar the finish of an automobile or the like.

Thus, we have disclosed a safety device which is inexpensive to manufacture and easily stored and, therefore, a number of these safety devices can be stored in automobiles, trucks, farm vehicles, etc. These safety devices can then be quickly utilized to outline or otherwise mark the vehicles and the operator of the vehicle while traveling at night or during emergency stops and can also be utilized to clearly indicate the presence of an individual walking on the highway. Because the reflective material can be placed on the safety device is designs attractive to children these devices are readily accepted by children frequently traveling along the road.

While we have shown and described specific embodiments of this invention, further modifications and improvements will occur to those skilled in the art. We desire it to be understood, therefore, that this invention is not limited to the particular form shown and we intend in the appended claim to cover all modifications which do not depart from the spirit and scope of this invention.

We claim:

A safety device comprising:
(a) an elongated belt of flexible material adapted to be attached about an individual by means of adjustable fastening means;
(b) means affixed to the outer surface of said belt for reflecting light impinging thereon; and
(c) magnetic means attached to the inner surface of said belt for temporarily affixing said belt to a metal surface, said magnetic means being relatively small so as not to produce discomfort to the individual during periods which the belt is being worn.

References Cited by the Examiner

UNITED STATES PATENTS

| | | | |
|---|---|---|---|
| 1,060,229 | 4/1913 | Casper et al. | 40—21 |
| 1,335,520 | 3/1920 | Muller | 250—71 |
| 1,943,440 | 1/1934 | Horni | 88—81 |
| 2,030,172 | 2/1936 | Kauffman | 88—80 |
| 2,117,201 | 5/1938 | Miller | 88—81 |
| 2,596,884 | 5/1952 | Bailen | 40—21 |
| 2,656,763 | 10/1953 | Frost | 88—80 |
| 2,671,423 | 3/1954 | Mead | 116—28 |
| 2,709,393 | 5/1955 | Anderson | 88—80 |
| 2,871,594 | 2/1959 | Halpert | 40—142 |
| 2,875,324 | 2/1959 | Camp et al. | 248—206 |
| 2,960,786 | 11/1960 | Wagner | 40—129 |
| 2,977,082 | 3/1961 | Harris | 40—142 |
| 3,089,143 | 5/1963 | Jacobson | 116—28 |
| 3,134,548 | 5/1964 | Medina et al. | 88—80 |

FOREIGN PATENTS

| | | |
|---|---|---|
| 1,225,742 | 2/1960 | France. |
| 1,248,049 | 10/1960 | France. |

LOUIS J. CAPOZI, *Primary Examiner.*